United States Patent [19]

Warren

[11] Patent Number: 4,552,927

[45] Date of Patent: Nov. 12, 1985

[54] CONDUCTING ORGANIC POLYMER BASED ON POLYPYRROLE

[75] Inventor: Leslie F. Warren, Camarillo, Calif.

[73] Assignee: Rockwell International Corporation, El Segundo, Calif.

[21] Appl. No.: 530,843

[22] Filed: Sep. 9, 1983

[51] Int. Cl.[4] .................... C08L 25/08; C08L 33/26; C08L 39/04

[52] U.S. Cl. .................................. 525/279; 525/186; 525/189; 525/203; 525/204; 525/281; 528/423

[58] Field of Search ............... 525/203, 279, 204, 281, 525/186, 189; 528/423

[56] References Cited

U.S. PATENT DOCUMENTS 3,828,008 8/1974 Shinohara et al. .................. 528/423

3,862,094 1/1975 Shinohara et al. .................. 528/423

OTHER PUBLICATIONS

"Electrochemical Polymerization of Pyrrole" *Journal of Chemical Society, Chemical Communications,* 1979, p. 635.

Electrochemistry of Conducting Polypyrrole Films", *Journal of Electroanlytical Chemistry,* 129, 1981, pp. 115–132.

*Primary Examiner*—Allan M. Lieberman

*Attorney, Agent, or Firm*—H. Frederick Hamann; Craig O. Malin

[57] ABSTRACT

A conducting organic polymer is disclosed consisting of a polypyrrole or an N-substituted analog of pyrrole and a non-nucleophilic polymeric anion. The polymer is formed by electropolymerizing pyrrole from an electrolyte containing a non-nucleophilic polymeric anion and pyrrole.

10 Claims, No Drawings

CONDUCTING ORGANIC POLYMER BASED ON POLYPYRROLE

STATEMENT OF GOVERNMENT INTEREST

The invention herein described was made in the course of or under a contract with the Department of the Navy.

BACKGROUND OF THE INVENTION

This invention relates to the field of conducting organic polymers and particularly to polypyrrole polymers.

Within the last few years, polymers have been discovered which have metallic properties, particularly high electrical conductivity. These polymers include polysulfur nitride, $(SN)_x$, doped polyacetylene, $(CH)_x$, and polypyrrole.

Although there are many potential applications for conducting polymers, their use has been thwarted by the fact that they are chemically unstable, have poor mechanical properties, and/or are difficult to produce in suitable forms.

Polypyrrole which is chemically more stable than the polysulfur nitride or the doped polyacetylene has proven to be very brittle. Thin polypyrrole films (from about 20 nm to 20 μm thick) have been produced on electrodes by electropolymerization. These films have been proposed for use as electrode surfaces. However these prior art films are too thin and too brittle to be useful in most structural-related applications.

Polypyrrole is produced by electropolymerization as described by A. F. Diaz, et al in an article entitled "Electrochemical Polymerization of Pyrrole" in the *Journal of Chemical Society, Chemical Communications,* 1979, page 635. This process produces very thin (from about 20 nm to 20 μm) durable films. N-substituted analogs of pyrrole such as poly-N-methylpyrrole and poly-N-phenylpyrrole have been used to form polypyrrole as reported by A. F. Diaz, et al in an article entitled "Electrochemistry of Conducting Polypyrrole Films" in the *Journal of Electroanalytical Chemistry,* 129, (1981) pages 115–132. In these processes, small anions such as tetrafluoroborate, bisulfate, and perchlorate from the electrolyte are used to dope the polymer and balance its cationic charge. However, these small anions do not provide the resultant polymer with the bulk and ductility needed to make the material useful in structural-related applications.

SUMMARY OF THE INVENTION

It is an object of the invention to provide a conducting polypyrrole which has improved ductility.

It is an object of the invention to provide a conducting polypyrrole which can be produced in thicker layers.

According to the invention, the conducting polymer is produced by electropolymerizing pyrrole from an electrolyte containing a non-nucleophilic polymeric anion and pyrrole. The resulting polymer has the formula:

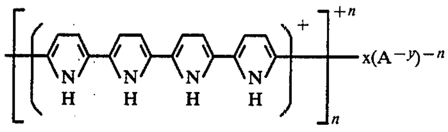

where "A" is the non-nucleophilic polymeric anion having a charge of −y. The integers "x" and "n" provide the proper quantities of the cationic polypyrrole and polymeric anion to balance the charge of the resulting polymer.

In a preferred embodiment, the polymeric anion "A" is a sulfonate polymer such as polystyrene sulfonate, polyvinyl sulfonate, and polyacrylamidomethylpropane sulfonate.

In additional embodiments, the cationic portion of the conducting polymers can be N-substituted analogs of pyrrole such as poly-N-methyl pyrrole and poly-N-phenylpyrrole.

These and other objects and features of the invention will be apparent from the following detailed description.

DESCRIPTION OF THE PREFERRED EMBODIMENT

Electrodeposition (or electropolymerization) of pyrrole from a suitable electrolyte produces a polypyrrole deposit which has a pyrrole chain cationic portion balanced by an affiliated electrolyte dopant anion. Normally, this dopant anion is a small anion (e.g. tetrafluoroborate, bisulfate, perchlorate) which can migrate in an out of the polymer depending upon the charge applied to the polymer. Consequently, the dopant anions have an important effect on the electrical properties of the polymer. This conducting organic polymer can be described by the following formula:

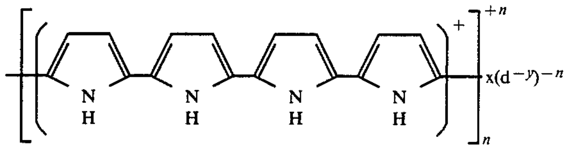

where "d" is a small dopant anion having a charge of −y which is balanced with the cationic charge of the polymer portion by the quantities "n" and "x".

In work leading to the present invention, it was discovered that large non-nucleophilic polymeric anions could be incorporated into the polypyrrole in place of the small anions as illustrated by the following formula:

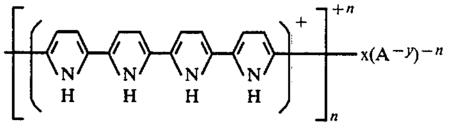

where "A" is a non-nucleophilic polymeric anion such as sulfonated polymers (e.g. polystyrene sulfonate, polyvinylsulfonate) derived from the acids or from alkali metal salts. A particularly flexible polyene anion may be derived from a styrene-butadiene copolymer by sulfonation of the aromatic rings.

These large anions do not migrate as readily (if at all) as the small anions, and yet the polymer still has good electrical conductivity. Of particular importance to the application of the material was the discovery that the polymeric anions incorporated some of their own desirable mechanical properties into the polypyrrole. Consequently, the films that were formed using polymeric anions had improved ductility, toughness, and more plastic-like properties compared to the brittle polypyrrole films formed using non-polymeric anions. Additionally, thicker films could be more easily obtained.

The following examples illustrate the method used to produce the conducting polypyrrole according to the invention.

EXAMPLE I

Polypyrrole-Polystyrenesulfonate (PP-PSS Acid)

Deposition of free-standing PP-PSS was carried out on a 28 $cm^2$ polished gold-plated copper disc. The electrode was laid face up in the bottom of a 1 liter beaker containing 600 milliters of electrolyte. A round platinum mesh basket counter electrode was suspended directly above the disc electrode. Electrolysis was conducted without stirring at a constant 2.15 $ma/cm^2$ current. The electrolyte contained 0.23 M pyrrole and about 0.055 M polystyrenesulfonic acid at a pH of 1.7. The pyrrole was distilled and stored under a nitrogen atmosphere. The polysterenesulfonic acid was obtained as a 30% aqueous solution of 100% substituted, molecular weight 70,000 material.

After electrolysis, the film was rinsed with water and allowed to dry, whereupon it delaminated from the electrode surface by itself, usually intact. The film had greatly increased mechanical flexibility as compared to prior art polypyrole films formed with small anion dopants. The approximate composition of the film, calculated from elemental analysis was: 92% $C_4H_3N(C_8H_7SO_3)_{0.25}$ and 8% oxygen. Properties of the film are shown in Table I.

EXAMPLE II

Polypyrrole-Polystyrenesulfonate (PP-PSS Sodium)

At a low pH such as the 1.7 used in Example I, pyrrole undergoes an acid-catalyzed polymerization reaction in which saturated pyrrole ring species are formed, and the deposition solutions become unuseable after several hours. Aqueous deposition electrolytes neutralized to pH 4 with sodium hydroxide are considerably more stable than the more acidic solutions. Consequently, a film of PP-PSS was prepared as shown for Example I except that the electrolyte contained 0.34 M pyrrole and 0.062 M Na polystyrene sulfonate and had a pH of 4.2. The current density was 3.57 $mA/cm^2$. The film which was produced was smoother than for the more acid condition and had the properties shown in Table I.

EXAMPLE III

Polypyrrole-Polyacrylamidomethylpropanesulfonate (PP-PAS)

A film of PP-PAS was electropolymerized as described for Example I except that the solution contained 0.35 M pyrrole and 0.022 M poly(2-acrylamido-2-methyl-1-propanesulfonic acid) at a pH of 2.4. Current density was 1.75 $mA/cm^2$. The approximate composition of the film, calculated from elemental analysis was: 91% $C_4H_3N(C_7H_{12}NSO_4)_{0.20}$ and 9% $O_2$. Properties of the film are shown in Table I.

TABLE I

Properties of Free-Standing Polypyrrole Films

| Example | Anion | Quantity Deposited ($C/cm^2$) | Measured Thickness (mil) | Density ($g/cm^3$) | Conductivity ($\Omega^{-1}cm^{-1}$) |
|---|---|---|---|---|---|
| I | PSS (acid) | 41.8 | 7.3 | .88 | 12.5 |
| II | PSS (sodium) | 37.5 | 4.2 | 1.7 | 2.7 |
| III | PAS | 38.5 | 8.5 | 0.77 | 7.7 |

As the above examples illustrate, polypyrrole incorporating non-nucleophilic polymeric anions is electrically conductive and has more useful mechanical properties. These properties, taken together with the fact that polypyrrole is the most environmentally stable of the conducting polymers provides many opportunities for use of the material in applications which require a conducting material, such as anti-static applications, electromagnetic interference (EMI) shielding, and electrical conductors.

Numerous variations and modifications can be made without departing from the invention. For example, the polypyrrole used in the electrolyte and in the resulting polymer can be an N-substituted analog of pyrrole such as poly-N-phenyl pyrrole or poly-N-methyl pyrrole. Other non-nucleophilic polymeric anions can be used to provide suitable mechanical properties to the material. These various modifications can be readily evaluated by empirical tests as illustrated by the above example. Accordingly, it should be understood that the form of the invention described above is illustrative and is not intended to limit the scope of the invention.

What is claimed is:

1. A conducting organic polymer having the following formula:

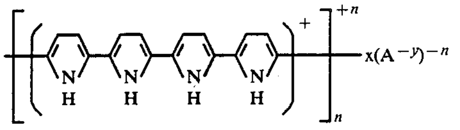

wherein A is a non-nucleophilic polymeric anion having a charge of −y.

2. The conducting organic polymer as claimed in claim 1 wherein A is a polystyrene sulfonate.

3. The conducting organic polymer as claimed in claim 1 wherein A is a polyvinyl sulfonate.

4. The conducting organic polymer as claimed in claim 1 where A is polyacrylamidomethylpropanesulfonate.

5. A conducting organic polymer comprising:

a polypyrrole; and a non-nucleophilic polymeric anion.

6. The conducting organic polymer as claimed in claim 5 wherein said polypyrrole comprises an N-substituted analog of pyrrole.

7. The conducting organic polymer as claimed in claim 6 wherein said N-substituted analog of pyrrole comprises poly-N-phenylpyrrole.

8. The conducting organic polymer as claimed in claim 6 wherein N-substituted analog of pyrrole comprises a poly-N-methylpyrrole.

9. The conducting organic polymer of claim 1 wherein the polymer is polypyrrolepolystyrenesulfonate having the following composition:

92% $C_4H_3N(C_8H_7SO_3)_{0.25}$; and

8% oxygen.

10. The conducting organic polymer of claim 1 wherein the polymer is polypyrrolepolyacrylamidomethyl propane sulfonate having the following composition:

91% $C_4H_3N(C_7H_{12}NSO_4)_{0.20}$; and

9% oxygen.

* * * * *